(12) United States Patent
Yeary

(10) Patent No.: US 7,857,098 B2
(45) Date of Patent: Dec. 28, 2010

(54) ELEVATED SPORTS STAND FOR THE HANDICAPPED

(76) Inventor: Enoch R. Yeary, P.O. Box 1457, Indian Trail, NC (US) 28079

( * ) Notice: Subject to any disclaimer, the term of this patent is extended or adjusted under 35 U.S.C. 154(b) by 509 days.

(21) Appl. No.: 11/977,517

(22) Filed: Oct. 25, 2007

(65) Prior Publication Data

US 2009/0110531 A1 Apr. 30, 2009

(51) Int. Cl.
 *E04G 3/00* (2006.01)
(52) U.S. Cl. .............................. 182/188; 43/89; 135/90
(58) Field of Classification Search ................ 182/187, 182/188, 145; 43/89, 108; 135/90; 414/546
 See application file for complete search history.

(56) References Cited

U.S. PATENT DOCUMENTS

| | | | | |
|---|---|---|---|---|
| 4,534,450 A * | 8/1985 | Savaria ........................ | 414/546 |
| 4,811,803 A * | 3/1989 | Green .......................... | 180/7.5 |
| 5,295,555 A * | 3/1994 | Strange ....................... | 182/2.5 |
| 5,595,265 A * | 1/1997 | Lebrocquy ................... | 187/261 |
| 6,079,517 A * | 6/2000 | Payne .......................... | 182/187 |
| 6,102,648 A * | 8/2000 | Fretwell et al. ............. | 414/540 |
| 6,105,728 A | 8/2000 | Combs, Jr. | |
| 6,357,992 B1 * | 3/2002 | Ringdahl et al. ............ | 414/545 |
| 6,379,102 B1 * | 4/2002 | Kameda ...................... | 414/546 |
| 6,435,801 B2 * | 8/2002 | Talbott ........................ | 414/462 |
| 6,435,804 B1 * | 8/2002 | Hutchins .................... | 414/540 |
| 6,471,269 B1 | 10/2002 | Payne | |
| 6,585,474 B1 * | 7/2003 | Kameda ...................... | 414/546 |
| 6,604,606 B1 | 8/2003 | McDougal et al. | |
| 6,978,862 B1 | 12/2005 | Cotton, Sr. | |
| 2003/0089019 A1 | 5/2003 | Napier | |
| 2003/0155179 A1 | 8/2003 | McDougal et al. | |
| 2003/0178251 A1 | 9/2003 | Hewitt | |
| 2005/0105994 A1 * | 5/2005 | Wolfe .......................... | 414/540 |
| 2005/0274573 A1 | 12/2005 | Smith | |
| 2006/0233632 A1 * | 10/2006 | Hayes et al. ................. | 414/546 |
| 2007/0169996 A1 * | 7/2007 | Blue et al. ................... | 182/141 |
| 2009/0010744 A1 * | 1/2009 | Sobota et al. ............... | 414/546 |
| 2010/0028115 A1 * | 2/2010 | Ablabutyan et al. ......... | 414/539 |

\* cited by examiner

*Primary Examiner*—Katherine W Mitchell
*Assistant Examiner*—Candace L Bradford
(74) *Attorney, Agent, or Firm*—McNair Law Firm; Henry S. Jaudon; Cort Flint

(57) ABSTRACT

An automated hunting blind which includes a platform operable to be always maintained in a generally horizontal position. The blind includes a base which is secured in an elevated position with a tree trunk. A boom is pivotally connected with the base and the platform. A drive and a control are provided to move the platform between a down position and selected elevated positions.

2 Claims, 4 Drawing Sheets

ELEVATED SPORTS STAND FOR THE HANDICAPPED

BACKGROUND OF THE INVENTION

This invention is directed to a power lift primarily intended for use by hunters, and specifically, structured to accommodate handicapped persons. The power lift is structured to be easily transported and mounted with trees or other vertical structures to position the mounting structure above ground level where it will not create a distraction for the game or be easily available to be vandalized. The power lift includes hand controls for ease of actuating the positioning movement. Also, a large railed platform is provided to accommodate or safeguard the user.

Other objects and structures become clear throughout the following disclosure.

SUMMARY OF THE INVENTION

The instant invention is directed to a lift for use in remote elevated positions. The lift has as its intended primary use, a hunting blind which is lightweight and is easily positioned for use. The lift must also be sturdy and reliable. It also must be easily accessible for use by handicapped persons.

The instant invention is directed to a lift device primarily intended for use as an automated hunting blind operable between raised and lowered positions. The device includes a base designed to be mounted in an elevated position with a substantially vertically extending member supported on the ground. A boom is pivotally mounted at a first end with the base and at a second end with a platform. A drive is carried by the device which is operative to move the boom and the platform between the lowered position in which the platform rests on the ground and a plurality of raised positions in which the platform is positioned in selected elevated positions. The device is designed to allow a person to move onto the platform when it is in the lowered position where the person may activate the drive and elevate the platform to selected elevated positions.

The boom comprises vertically spaced and parallel support members, each pivoted at first ends with the base and at second ends with the platform. The vertically spaced pivots of the boom maintain the platform generally horizontal during movement between the lowered position and the elevated positions.

The base includes mounting members securing it with the vertically extending member. The vertically extending member may comprise a tree trunk, or any post-type member of sufficient size.

The boom includes a pair of parallel laterally spaced interconnected beams pivoted with upper areas of the base and the platform. Also, a pair of laterally spaced rods pivoted with lower areas of the base and the platform. A drive member is pivotally connected with the boom and the base, and is operative to move the boom. A power source is provided for the drive member and is carried by the platform. A control, which is connectable with the power source, is provided and is operative to activate and deactivate the power source. The drive member preferably comprises a pneumatic piston while the power source preferably comprises a compressor, driven by a battery. The platform may be formed on two levels. At least the lower platform is capable of receiving and supporting a wheelchair.

A plurality of connections, connected with the power source are carried by the platform and the base. A control, which is removably connectable with either connection, is operative to control operation of the power source. The control is removable, which renders the drive for the lift inoperative when the lift is left in its mounted position between times of use.

An automated hunting blind is positionable between a down position and a plurality of elevated positions. The hunting blind includes a platform which is maintained at all times in a generally horizontal position and is adapted to support a power supply for a drive, and a hunter in a sitting position. The blind includes a base which is secured in an elevated position with a tree trunk. The base is pivotally connected with a boom which in turn, is pivotally connected with the platform. A control, for operating the drive, is provided. The control operates the power source which moves the drive to move the platform between a lowered position and selected elevated positions.

The invention includes a method of transporting and mounting a hunting blind in an elevated position with a tree which method includes the steps of providing an automated hunting blind having a boom and pivotally mounting the boom with a base and a platform; of providing a carrier trailer which is adapted to transport the hunting blind and positioning the hunting blind on the trailer with the base in an elevated position and adjacent an end of the trailer; and of transporting the trailer into a position with the base of the blind adjacent a tree trunk and in an elevated portion; and securing the base in the elevated position with the tree trunk and removing the trailer.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
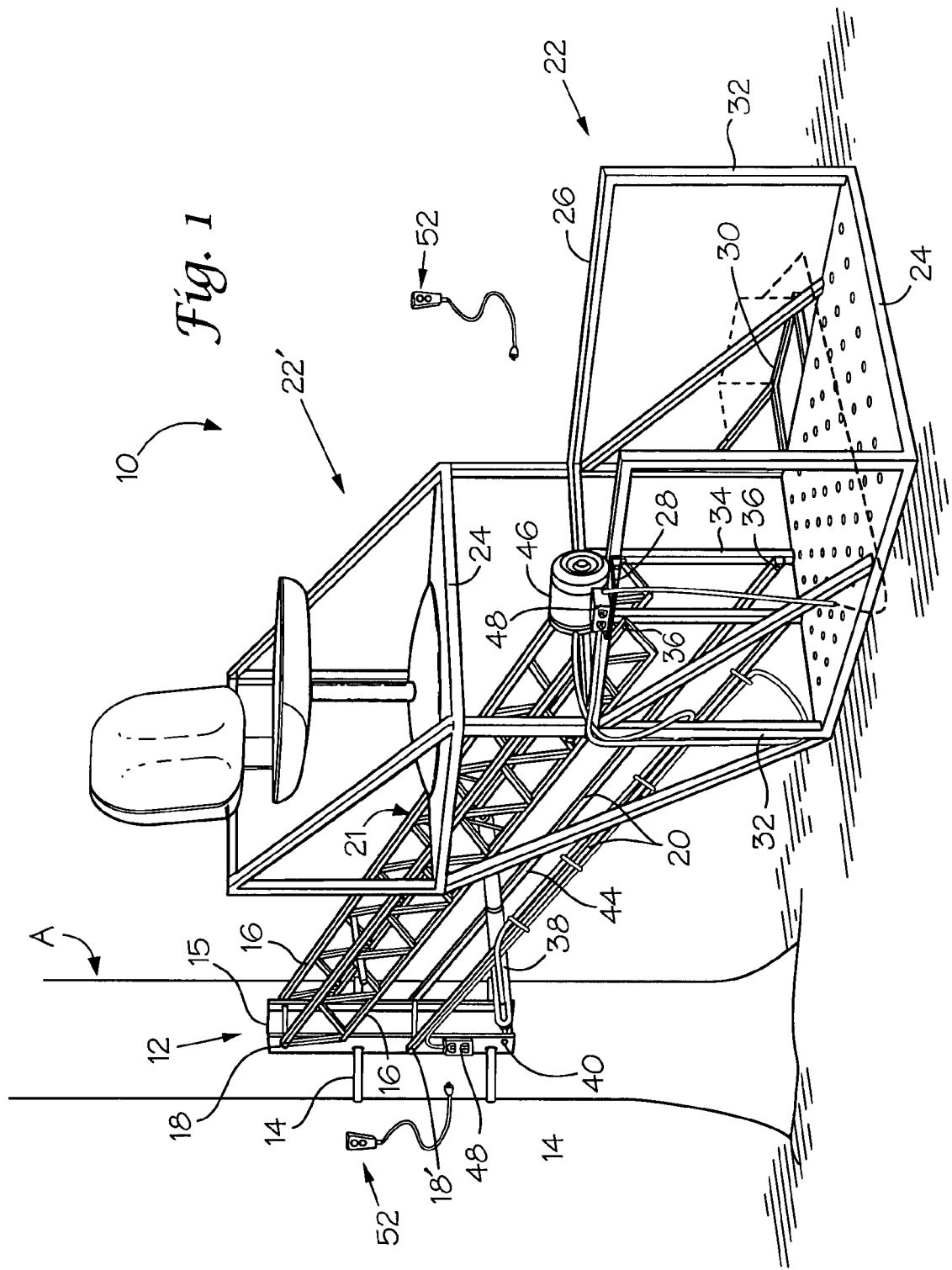
FIG. 1 is a perspective view of the lift of the invention in the down position.
Figure 2:
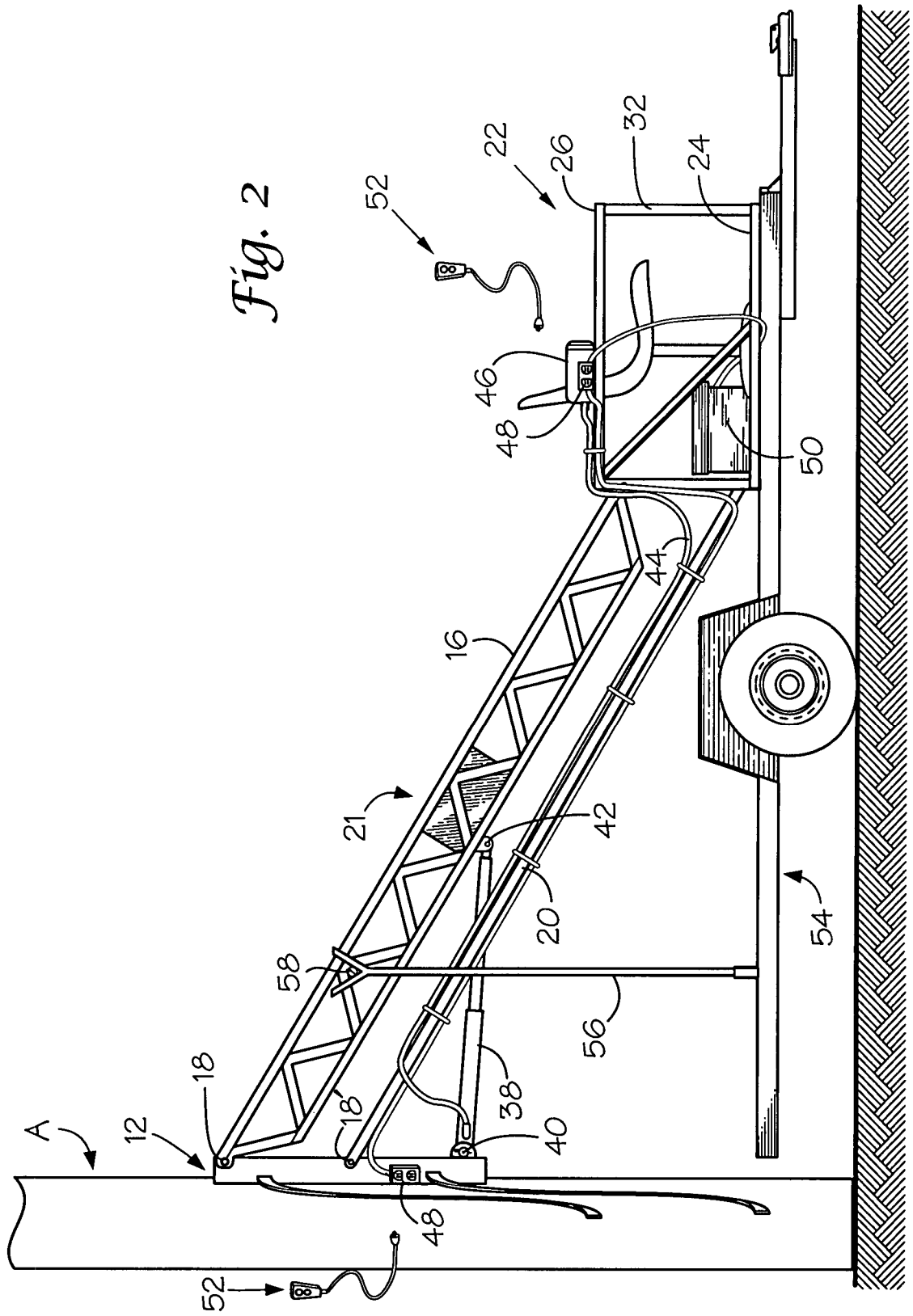
FIG. 2 is a side view of the lift of the invention on a carry trailer and in position to be mounted with a tree.

Referring now to FIGS. 1 and 2, the lift of the invention can be seen in its transport position, ready for mounting in an elevated position with a tree and in its mounted position with a tree trunk.

Figure 3:
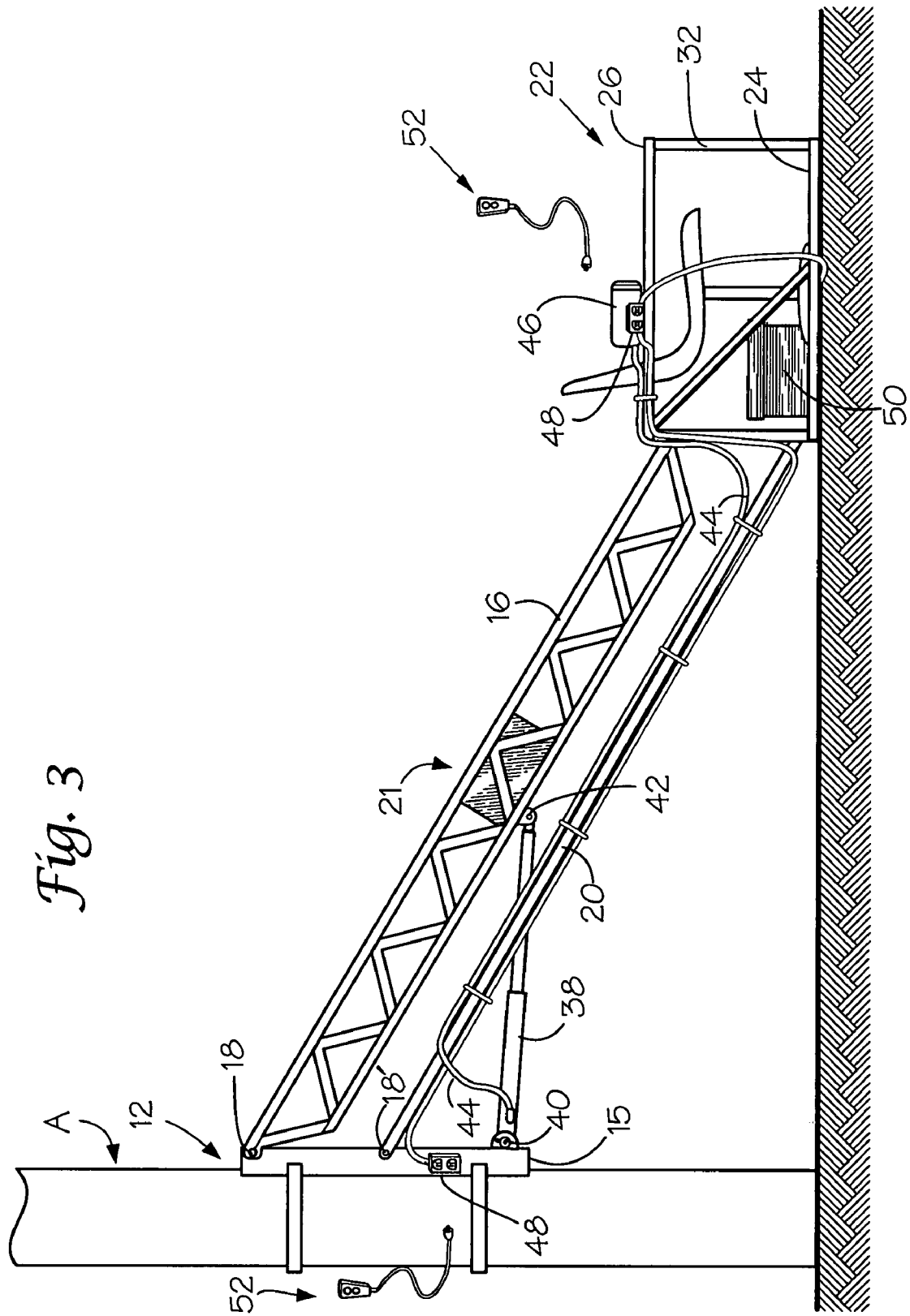
FIG. 3 is a side view of the lift in the down position.

FIGS. 1 and 3 shows the lift in its down or ground position ready to be mounted by its user.

Figure 4:
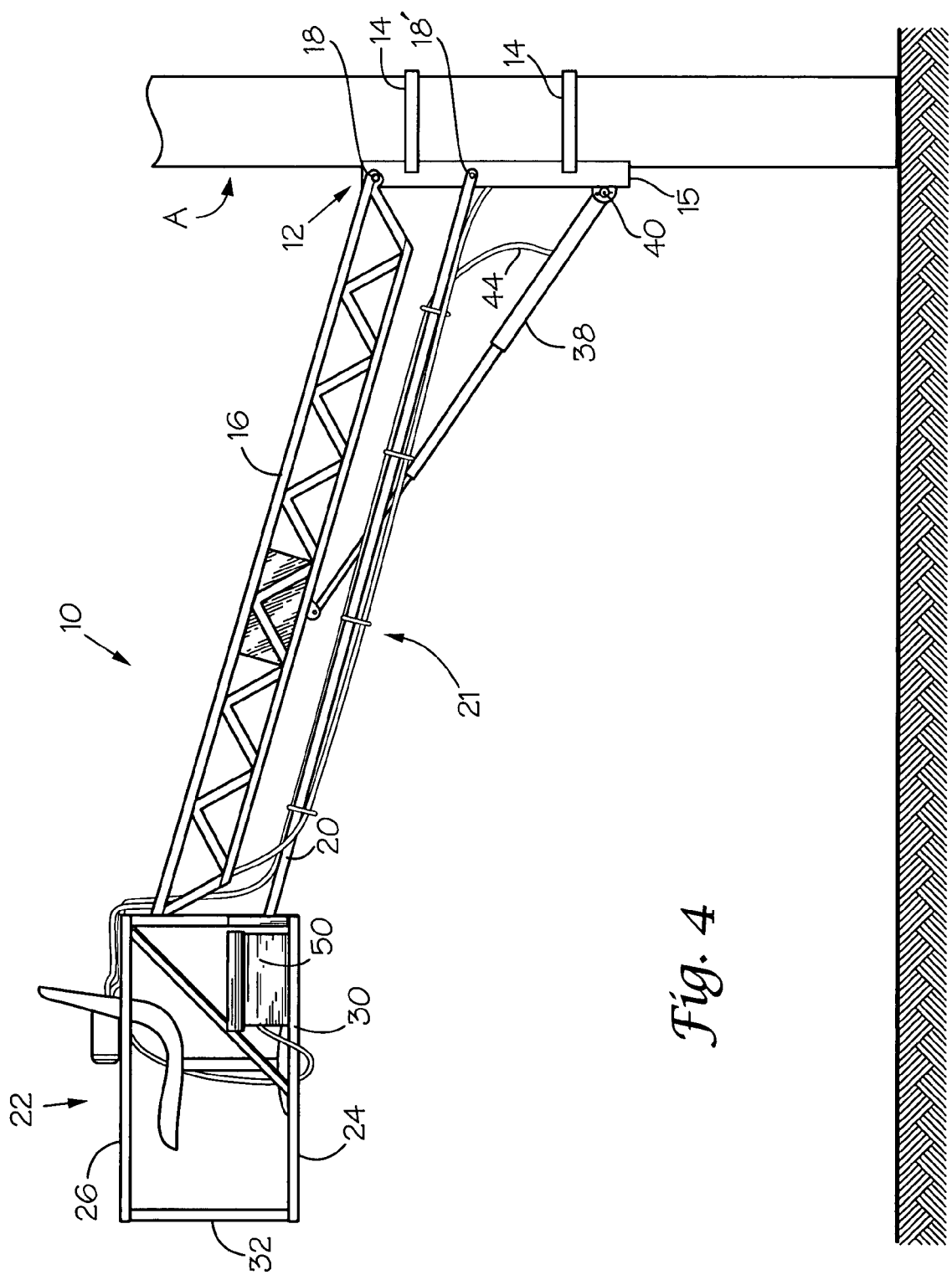
FIG. 4 is a side view of the lift in a raised position.

In FIG. 4, the lift is shown in its elevated or raised position where the user is positioned at a desired height above the ground.

Turning now to FIGS. 1-4, lift 10 consists of base 12 mounted in an elevated position with tree A by mounting members or straps 14, which wrap about the tree and are secured in position by suitable connectors. Base 14 may consist of a linear member in the form of an I-beam 15 having a generally planar central portion and opposed sides which extend perpendicular of the central opening. There may be serrations or spikes on the rear or outer side of beam 15 to better secure with the tree. It is noted that tree A may be any generally circular, vertically extending member, which is sufficiently sturdy to support the lift. Also, straps 14 may be any suitable flexible elongate member having some type of hook, buckle or engaging member for securing with the tree.

Engaged with base 12 are pair of beams 16 which are parallel and interconnected. Beams 16 are pivotally connected at 18 with the upper end of base 12 by way of a bolt. Beams 16 may be of any suitable structure so long as they possess proper rigidity and are lightweight. The beams shown are of ladder construction.

Vertically aligned beneath beams 16 are a pair of rods 20 pivotally mounted at 18' also by way of a bolt with an intermediate portion of base 12. Rods 20 and beams 16 are of equal length and together form boom 21.

Platform 22, which includes floor 24, side rails 26, power unit mount 28 and battery mount 30, is pivotally mounted at the opposite end of boom 21. Rails 26 are supported by bars 32 at each corner of the floor. A pair of intermediate support bars 34 are secured with the rail and floor sections along the inner side of floor 24. If desired, additional support members may be provided for intermediate bars 34.

The opposed ends of beams 16 and rods 20 are pivotally mounted at 36 with intermediate bars 34. Rods 20 are connected adjacent lower ends of intermediate bars 34 while beams 16 are mounted adjacent their upper ends.

It is noted the pivots at 18, 18' and 36 are evenly spaced vertically and horizontally, allowing beams 16 and rods 20 to always remain parallel, both vertically and horizontally, thus forming the boom 21. This arrangement maintains the platform always along a horizontal plane.

A drive 38, which here comprises a hydraulic cylinder and piston, is pivotally connected at 42 with an intermediate portion of beam 16 and at 40 with base 12 adjacent its lower end. A supply line 44 extends from drive 38, along rod 20 to power source 46 which is carried on mount 28 of platform 22. Power source 46, in this instance, comprises an hydraulic pump.

Connections 48, which are secured with base 12 and platform 22, are each connected by suitable leads with power source 46 and with battery 50 carried by battery support 30.

A control member 52 is adapted to connect with either connector 48 and is operative to actuate and de-actuate hydraulic pump 46. The connector mounted with base 12 allows the platform to be raised for storage and protection from vandals while the platform mounted connector allows the platform to be controlled by a person on the platform seeking a desired elevated position.

The hydraulic piston is operative to be extended to selected desired lengths which acts to pivot beams 16 and rods 20 about pivots 18 and 18' upward. The opposed ends of beams 16 and rods 20 cause platform 22 to remain level as they pivot about pivots 36 connected with the platform.

The platform is lowered when the hydraulic pump is inoperative and the cylinder is allowed to bleed out. The desired height is maintained by maintaining the pressure content in the cylinder. The platform is raised by increasing the pressure in the cylinder, causing the piston to move outwardly.

As shown in FIG. 1, lift 10 may include two platforms 22, 22'. Platform 22' is substantially identical but positioned above platform 22, and simply allows an additional person to use the stand.

Platform 22 is sized to accommodate a wheelchair allowing a disabled person the ability to use the stand. Rail 26 may extend completely around the platform with the rail along the outer entrance side being removable.

FIG. 2 shows lift 10 positioned on a carry trailer 54 with boom 21 in an elevated position and base 12 adjacent a tree trunk in an elevated position. Stand 56, comprising a pair of vertical rods, mounting a removable horizontal rod 58, maintains the boom in position during transport and mounting. Once belts or straps 14 are connected with the tree, securing base 12 in position, rod 58 is removed and trailer 54 is taken away. At this point, platform 22 settles to the ground and the lift is ready for use.

While a preferred embodiment of the invention has been described using specific terms, such description is for illustrative purposes only, and it is to be understood that changes and variations may be made without departing from the spirit or scope of the following claims.

What is claimed is:

1. A method of transporting and mounting a hunting blind in an elevated position with a tree including, in the order listed, the steps of:
   providing an automated hunting blind having a boom pivotally mounted with a base and a platform;
   providing a trailer adapted to transport said hunting blind and positioning said hunting blind on said trailer with said base in an elevated position and adjacent an end of the trailer;
   transporting the trailer into a position adjacent a tree trunk with said base adjacent an elevated portion of said tree trunk;
   securing said base with said tree trunk and separating the hunting blind from said trailer; and
   removing said trailer from its position adjacent said tree trunk; and
   causing said boom to pivot vertically to move said platform between a down position and selected elevated positions.

2. A method of transporting and mounting a hunting blind with a generally vertically extending support in a selected elevated vertical position including, in the order listed, the steps of:
   providing said hunting blind with a boom pivotally mounted with an elongated base and a platform;
   positioning said hunting blind on a trailer with said base being adjacent an end of said trailer and in a selected elevated position;
   positioning said trailer adjacent said vertically extending support with said base adjacent said support in said selected elevated position;
   securing said base with said support with their longitudinal axes being substantially parallel and removing said trailer; and causing said boom to pivot vertically to move said platform between a down position and various elevated positions while maintaining said platform always in a generally horizontal position.

\* \* \* \* \*